No. 751,320. PATENTED FEB. 2, 1904.
G. A. MEAD.
MANUFACTURE OF RAIL BONDS.
APPLICATION FILED OCT. 22, 1903.
NO MODEL.

Witnesses:
Ray White
[signature]

Inventor:
George A. Mead
By Brown & Darby
Att'ys.

THE NORRIS PETERS CO., PHOTO-LITHO., WASHINGTON, D. C.

No. 751,320.　　　　　　　　　　　　　　　Patented February 2, 1904.

UNITED STATES PATENT OFFICE.

GEORGE A. MEAD, OF MANSFIELD, OHIO, ASSIGNOR TO THE OHIO BRASS COMPANY, OF MANSFIELD, OHIO, A CORPORATION OF NEW JERSEY.

MANUFACTURE OF RAIL-BONDS.

SPECIFICATION forming part of Letters Patent No. 751,320, dated February 2, 1904.

Application filed October 22, 1903. Serial No. 178,055. (No model.)

*To all whom it may concern:*

Be it known that I, GEORGE A. MEAD, a citizen of the United States, residing at Mansfield, in the county of Richland and State of Ohio, have invented a new and useful Improvement in Manufacture of Rail-Bonds, of which the following is a specification.

This invention relates to manufacture of rail-bonds.

Heretofore in the manufacture of rail-bonds, and especially rail-bond terminals, it has been a common practice to subject the ends of the strands or laminations forming the body portion of the bond to a heat of a suitable temperature and while in such heated condition to subject the same to a quick pressure between suitably-shaped swaging-dies, thereby consolidating and welding the ends of the strands or laminations into a homogeneous mass, thereby forming a consolidated blank end. The upset mass is then again heated and again subjected to pressure in order to produce the final shaping of the terminal. I have found in the practice of this method that the quality of the copper of the bond strands or laminations is seriously impaired by reason of repeatedly subjecting the same to heat in the process of forming the terminal studs.

It is among the special purposes of my present invention to provide a process wherein the terminal stud is first formed into shape by pressure without heating and is finally shaped and finished, thus eliminating to a large extent the objections found in practice to result from repeatedly heating the ends of the strands or terminals in the process of manufacture of rail-bonds as heretofore commonly carried out.

Other objects of the invention will appear more fully hereinafter.

The invention consists, substantially, in the mode of procedure and process of operation, all as will be more fully hereinafter set forth, as illustrated in the accompanying drawings, and finally pointed out in the appended claims.

Figure 1:
Figure 2:
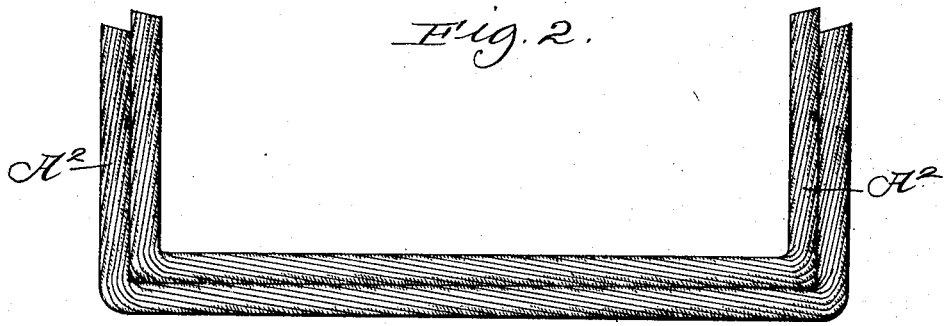
Figure 3:
Figure 4:
Figure 5:
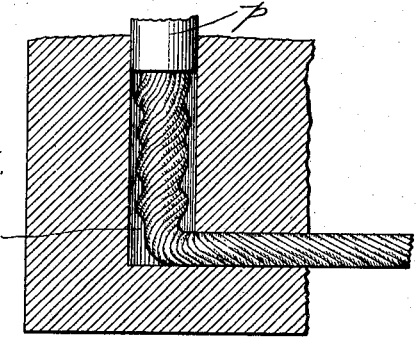

Referring to the accompanying drawings, Figure 1 is a view showing a section of stock or material which may be employed in carrying out the process of my invention. Fig. 2 is a view showing the blank-section of stock with its ends bent into substantially right-angular relation with the body portion and illustrating one way of preparing the blank for operation in accordance with the princples of my invention. Fig. 3 is a view illustrating the bond after the ends of the blank have been shaped in the cold to form the bond-terminals. Fig. 4 is a view of one form of the finished product. Fig. 5 is a broken sectional view illustrating the manner of shaping the ends of the blank in the cold to form the terminals.

In carrying out my invention I provide a blank, (indicated at $A'$ in Fig. 1,) which may be of any suitable form or shape in cross-sectional area and comprising stranded or laminated copper wires or strips. In the particular form illustrated, to which, however, my invention is not limited, I have shown two stranded cables arranged in parallel relation. It is obvious that only a single cable composed of strands or laminations may be employed.

In carrying out my process the ends of the cable or cables, stranded or laminated, as above described, are upset in the cold to preliminarily form the cable-studs, the bond so formed being shown in Fig. 3. If desired, the ends of the stranded or laminated cable or cables may first be bent into right-angular relation, as shown in Fig. 2, preliminary to being upset and compressed, and I have found this a convenient manner of handling the bond in carrying out my invention. The ends of the blank, either with or without bending the same into right-angular relation with respect to the body portion, as shown at $A^2$, Fig. 2, are then subjected in the cold to the action of a suitable forming-tool, by which the ends of the strands or laminations forming the cable or cables are cold-pressed and upset into approximately the desired form and shape of terminal. It is obvious that any suitable or convenient type of forming-tool may be employed, such as will crowd or press the ends of the cable strands or laminations into approximately the desired shape, as shown at $A^3$, Fig. 3, to be given the terminal $A^4$, Fig. 4, of the finished product. In Fig. 5 the action of such a forming-tool is illustrated, in which the portion of material which is to form the bond-terminal is placed in a suitable cavity c, into which enters a plunger, preferably in a direction to upset the ends of the strands or laminations endwise, thereby crowding, upsetting, compressing, or bending such ends into the form illustrated at $A^3$, Fig. 3. I regard this as an important step of my process, in that it enables the material to be cold-pressed into the desired shape to form the terminal stud and free from impurities such as become incorporated into the copper during heating and forging operations such as have heretofore been commonly practiced in the manufacture of rail-bonds, and I thus avoid any deterioration of the copper, and I reduce the material forming the terminal studs of the bond to a condition enabling it to be perfectly welded into absolute homogeneous union in the subsequent step of my process. It is obvious that this cold-pressing operation is facilitated by reason of the stranded or laminated structure of the cable or body portion of the bond and results merely in an intimate rearrangement and compressing together during the upsetting and bending operation of the wires or laminations as distinguished from a heating and forging operation such as is commonly practiced, in which the molecules of the copper are, by reason of the heat to which the copper is subjected, rearranged in the mass.

The final step of my invention consists in applying a welding heat to the formed terminal studs at the end of the body portion of the bond and subjecting the same to pressure, and this step may be carried out in any suitable or convenient manner, and the welding operation is completed by the operation of any suitable stamping-press or other tool, thereby compressing the upset end portions of the strands or laminations into a solid homogeneous mass to form the terminal stud $A^4$ of the finished product.

As before indicated, the body portion of the stock may be of many different forms and construction and arrangement of the strands or laminations composing the same. It is also obvious that the terminal studs of the finished product may be given any suitable or desired shape in cross-section, as may be desired. I do not desire, therefore, to be limited or restricted in these respects; but, Having now set forth the object and nature of my invention and a manner of carrying the same into practical effect and operation, what I claim as new and useful and of my own invention, and desire to secure by Letters Patent, is—

1. The process of making rail-bonds from stranded or laminated material, which consists in pressing the component strands or laminations, in the cold, into approximately the shape of the terminal of the finished product, and finally subjecting the formed portions to a welding heat, as and for the purpose set forth.

2. The process of making rail-bonds from stranded or laminated material, which consists in first bending the ends of the strands or laminations into right-angular relation with respect to the body portion of the bond, then upsetting such bent ends in the cold to form studs or terminals of approximately the shape desired in the finished product, and finally subjecting the upset portions to a welding heat and pressure, as and for the purpose set forth.

3. The process of making rail-bonds from stranded or laminated material, which consists in upsetting, bending, or folding upon each other, the ends of the component strands or laminations in the cold state, and then subjecting the upset portions to a welding heat, and finally applying pressure, as and for the purpose set forth.

In witness whereof I have hereunto set my hand, this 20th day of October, 1903, in the presence of the subscribing witnesses.

GEORGE A. MEAD.

Witnesses:
WM. D. LIGON,
R. R. REED.